United States Patent [19]
Pohl

[11] 4,168,134
[45] Sep. 18, 1979

[54] VEHICLE DOORWAY LIFT

[76] Inventor: Leo Pohl, #6, 4826 - 11 St., NE., Calgary, Alberta, Canada, T2E 2W7

[21] Appl. No.: 882,406

[22] Filed: Mar. 1, 1978

[51] Int. Cl.² .............................................. B60P 1/46
[52] U.S. Cl. ................................... 414/545; 105/445; 105/447; 280/166; 414/921
[58] Field of Search .......... 214/75 R, 77 R, DIG. 13; 105/447, 448, 449; 280/166

[56] References Cited

U.S. PATENT DOCUMENTS

| | | | |
|---|---|---|---|
| 3,651,965 | 3/1972 | Simonelli et al. | 214/75 R |
| 4,027,807 | 6/1977 | Thorley | 214/75 R |

*Primary Examiner*—Robert G. Sheridan
*Attorney, Agent, or Firm*—Ernest Peter Johnson

[57] ABSTRACT

A lift assembly is provided which can be mechanically converted from a stationary step-like configuration to a movable platform configuration, thus allowing both handicapped and non-handicapped passengers to use a single vehicle entrance having the lift assembly operative within it.

A pair of lifting columns are provided which are movable along guide members mounted at the entrance of the vehicle. A platform is hingably connected at its inner edge to the bases of the lifting columns and comprises a linear assembly of hinged plates. Radius arms, pivotally connected with the outer edge portion of the platform and with the lifting columns, suspend the outer end of the platform. Means, such as hydraulic cylinders, pivotally connected with the outer edge portion of the platform and with the lifting columns, are controlled to extend or contract the assembly of hinged plates between a flat, horizontal configuration level with the floor surface of the vehicle and a step-like configuration within the opening and also act to securely maintain the plates in the desired configuration. Means are provided to raise or lower the lifting columns while the platform is in the flat, horizontal configuration. In this manner the platform may be lowered to the grade to receive a passenger and raised to the level of the vehicle floor.

7 Claims, 7 Drawing Figures

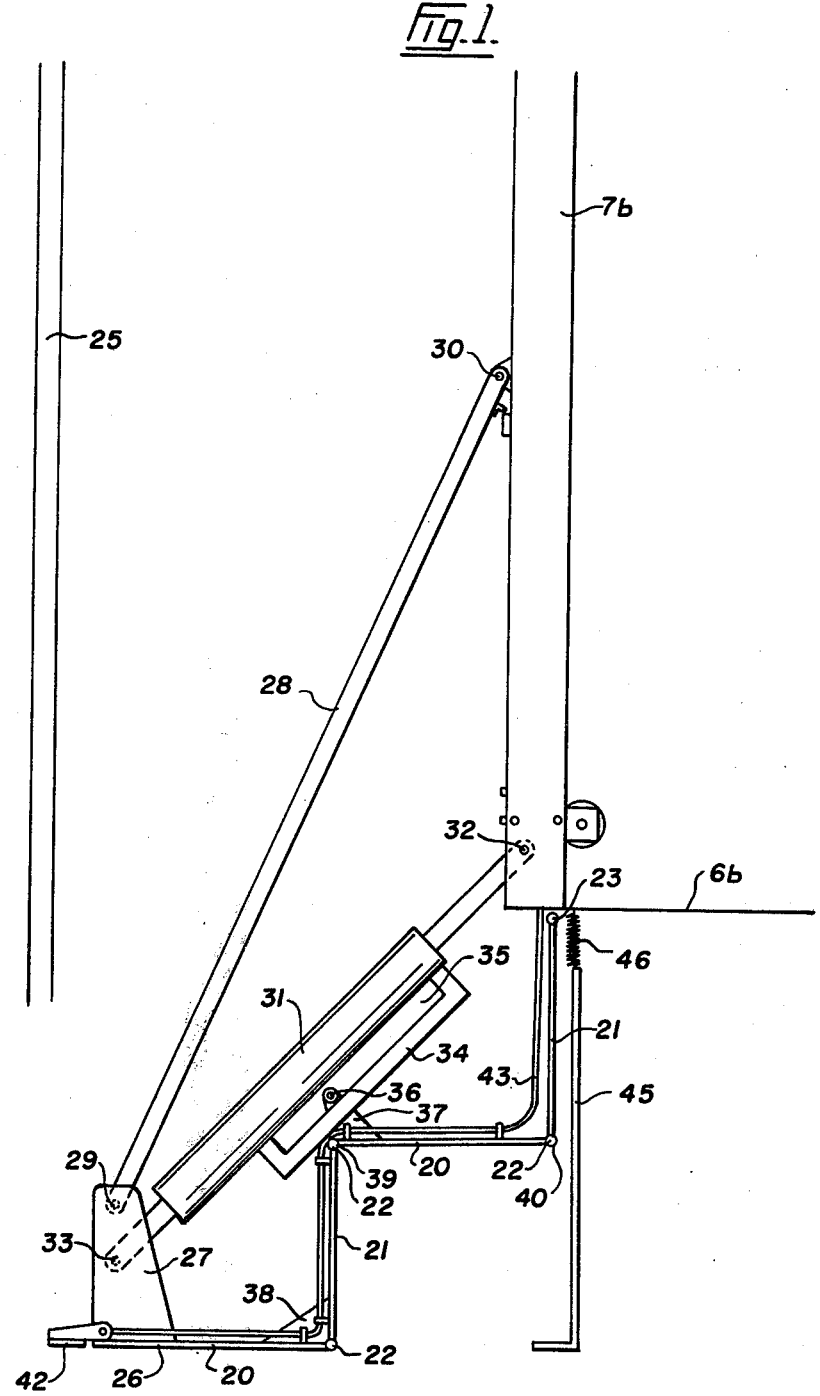

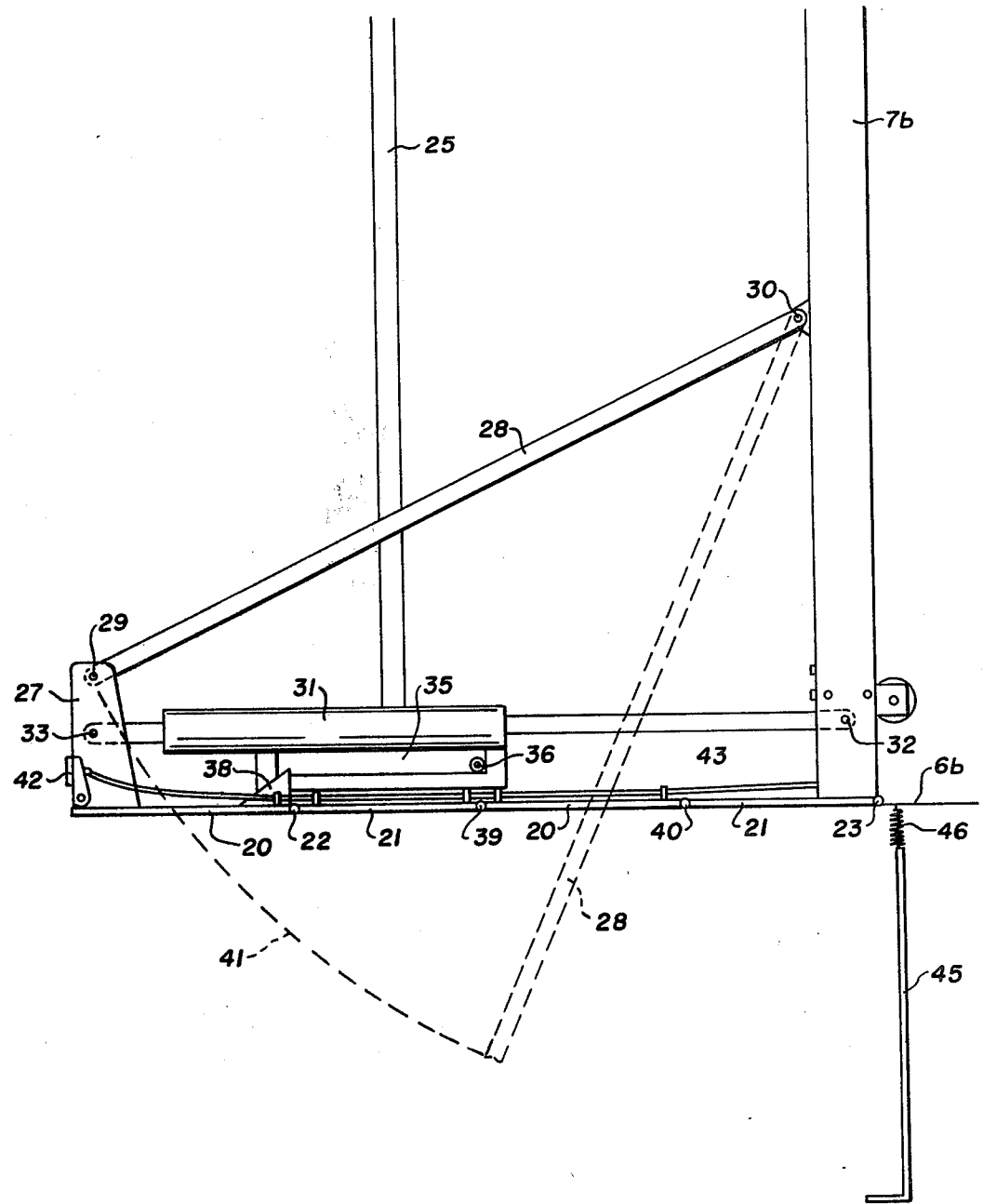

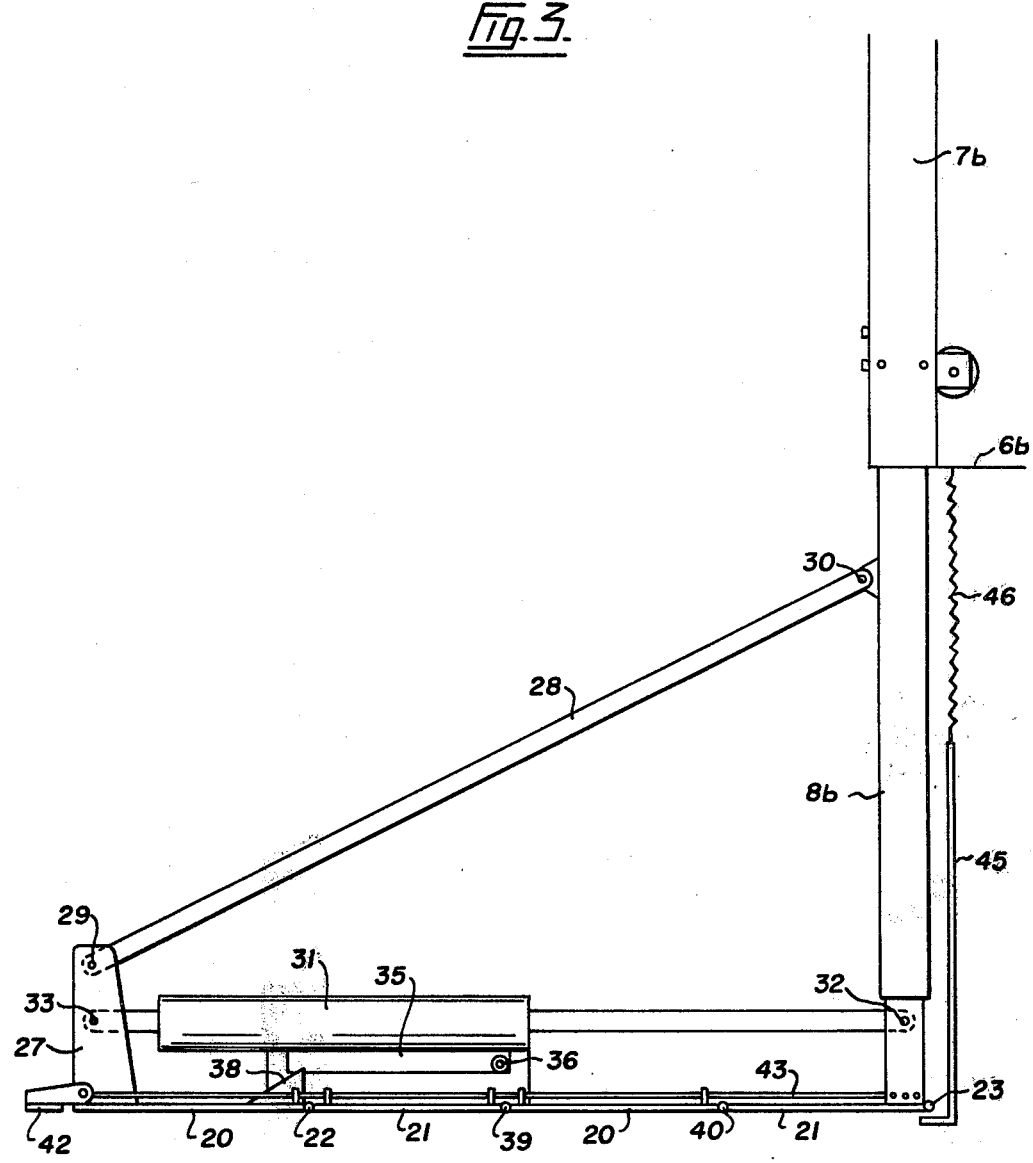

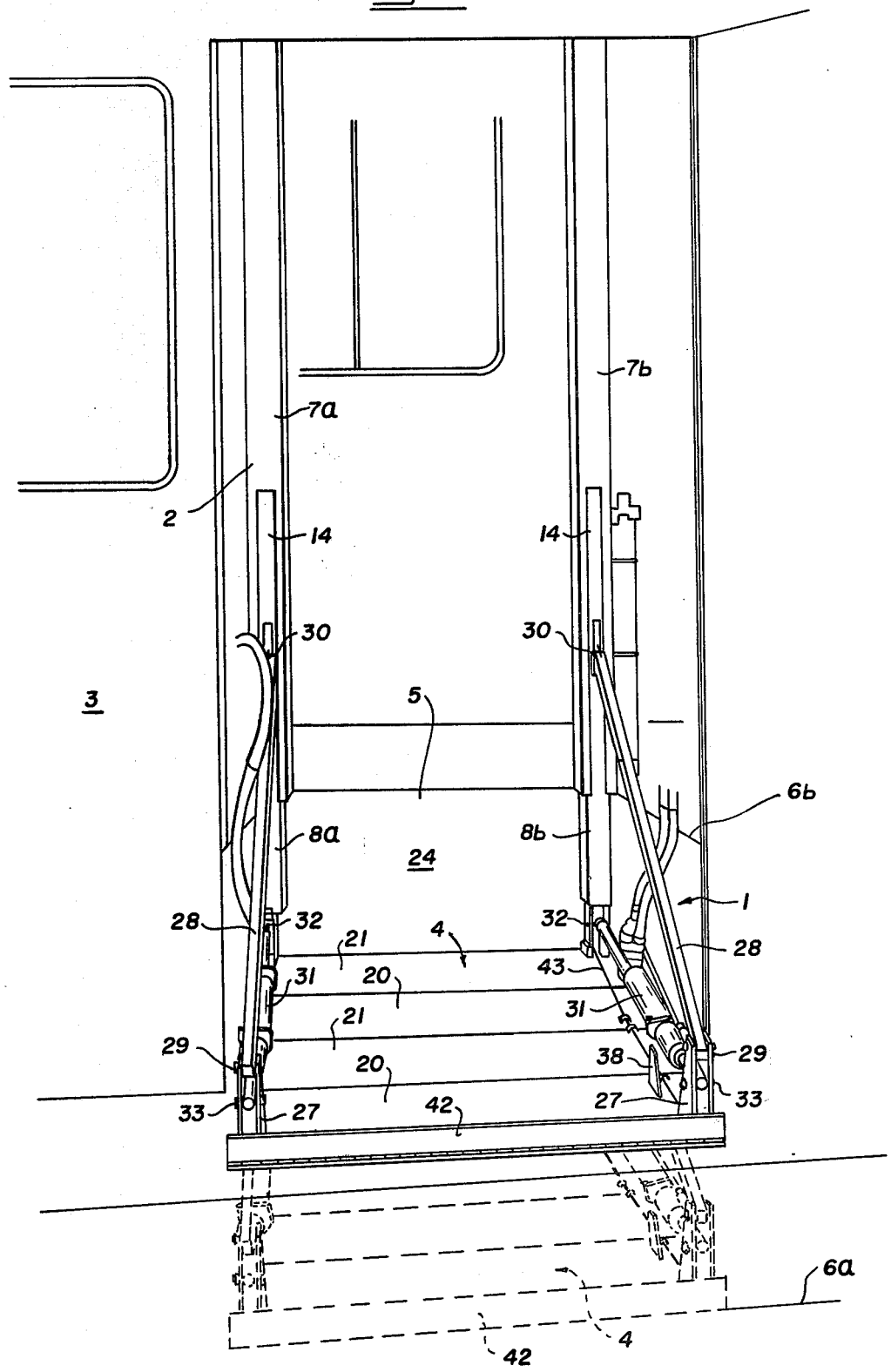

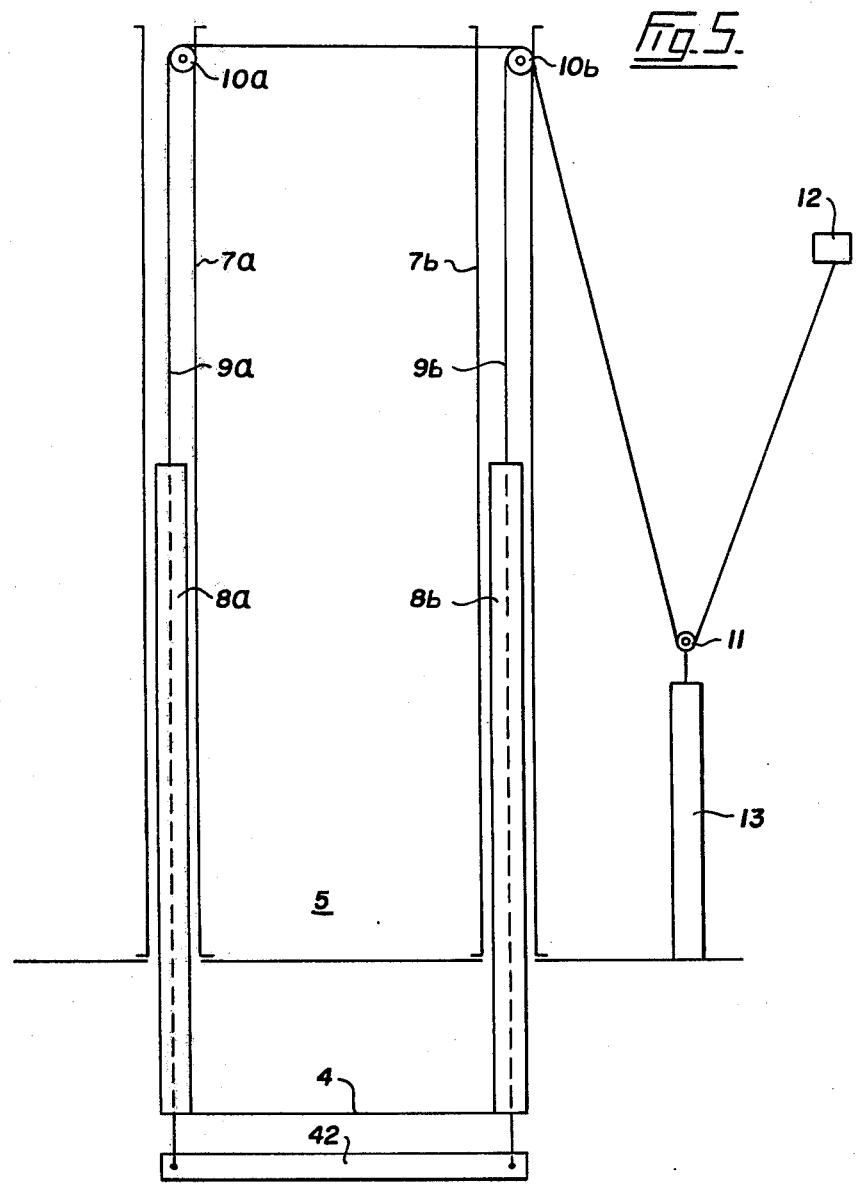
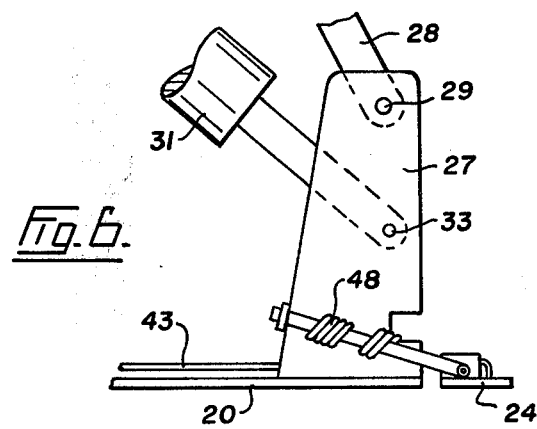

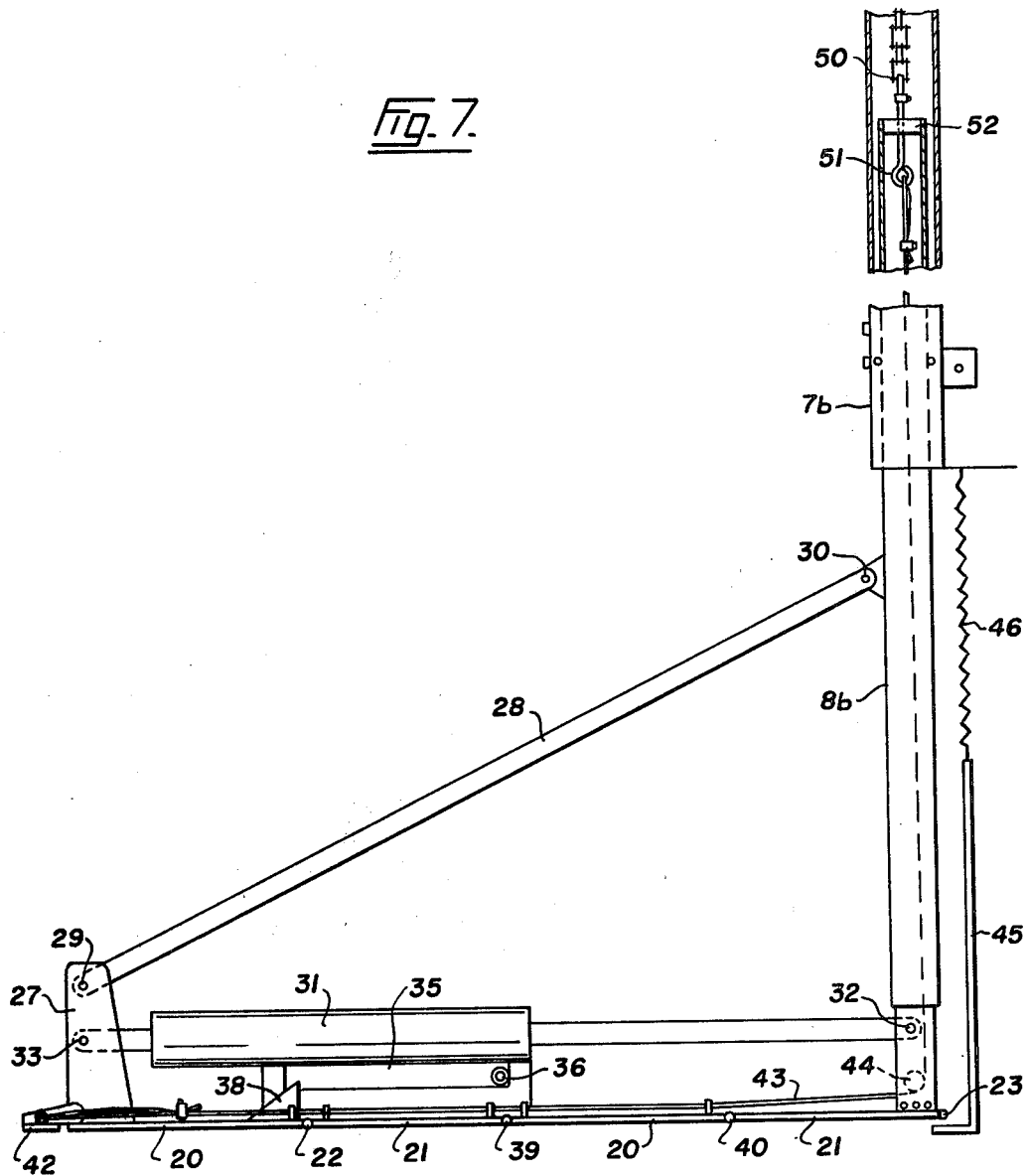

VEHICLE DOORWAY LIFT

BACKGROUND OF THE INVENTION

This invention relates to a lift assembly that can be used both by passengers on foot and by passengers in wheelchairs in boarding or getting off a vehicle, such as a bus.

Heretofore, commercial lift assemblies for use by the handicapped in connection with buses and the like have usually involved a large one-piece platform that pivots about its inner edge from a vertical stored position in the doorway to a horizontal floor-level loading position. When in the horizontal position, the platform may be lowered and raised with a passenger aboard between grade and the bus floor level.

A problem with this prior art type of lift assembly is that it cannot conveniently be used by foot passengers. The problem has until now been dealt with by providing a vehicle with two entrances. The lift assembly is mounted in one entrance for use by handicapped passengers, and a conventional step assembly is mounted in the other entrance for use by foot passengers.

It is therefore the object of this invention to provide a lift assembly which can be mechanically converted from a stationary step assembly to a movable lift assembly. This would make it possible for a single entrance unit to be used for both handicapped and non-handicapped passengers.

SUMMARY OF THE INVENTION

In accordance with the invention there is provided a platform comprising an assembly of alternating tread and riser plates hinged together in end-to-end arrangement and convertible from a step-like configuration to a flat horizontal configuration. When in the latter configuration, the platform can be lowered and raised with a passenger aboard between grade and the floor level of the vehicle. The platform can be installed in a vehicle doorway and used both by foot and wheelchair passengers.

More particularly, the platform is positioned in a recessed rectangular opening, such as is normally provided in the sill of a bus to accommodate the doorway steps. A pair of substantially vertical guide members are fixed to the vehicle at the inner corners of the opening. A movable lifting column slides along each such guide member, for a purpose to be described. The innermost plate of the platform, being a riser plate, is connected by hinge means to the bases of the lifting columns. A pair of tension members or radius arms extend between the outermost plate of the platform and the lifting columns at a level spaced well up along the length of the columns. Each of these tension members is pivotally connected at its ends to the platform and to one of the lifting columns. The tension members are operative to assist in the suspension of the platform. Thus the platform is suspended at its inner and outer ends from the vertically movable columns. Means are provided for expanding and contracting the platform to convert it from the step-like configuration to the flat horizontal configuration and back again. Such means preferably comprise a pair of hydraulic cylinders, each such cylinder being pivotally connected with one edge portion of the outer plate of the platform and with the base of one of the lifting columns. The cylinders may be locked in either of the configurations to hold the plates fixed in that configuration. Preferably, each such cylinder is connected with the plate assembly between said plate assembly's ends by a slotted bracket and pin device to assist in suspending the plates so the assembly does not sag at its middle. Means are also provided for controllably raising and lowering the lifting columns. Such means may comprise a pair of roller chains, each being attached to one of the lifting columns, said roller chains being connected to and moved by a hydraulic cylinder mounted within the vehicle.

Broadly stated, the invention is a lift assembly for use in connection with a recessed opening forming part of the doorway of a vehicle having a floor surface, comprising: a pair of substantially vertically movable lifting columns associated with the vehicle and positioned at the opening; first means associated with the vehicle for controllably raising and lowering said lifting columns; second means fixed to the vehicle for guiding the lifting columns as they move substantially vertically between raised and lowered positions; a platform disposed in the opening and comprising a linear assembly of alternating tread and riser plates interconnected by hinge means in end-to-end arrangement, said platform being connected to the bases of the lifting columns at its inner edge portion by hinge means whereby the inner end of the platform is thereby suspended; third means, pivotally connected with the outer edge portion of the platform and with the lifting columns, said third means being operative to suspend the outer end of the platform from said lifting columns; and fourth means, pivotally connected with the outer edge portion of the platform and with the lifting columns, for extending and contracting the assembly of plates between a flat horizontal configuration level with the floor surface and a step-like configuration within the opening and for retaining said plates in each of said configurations when required; whereby extension of said fourth means in combination with rotation of the third means about its pivot connections with the lifting columns forces the plates from the step-like configuration to the flat horizontal configuration, and whereby subsequent lowering of the lifting columns results in lowering of the flat horizontal platform to grade and subsequent raising of the lifting columns results in raising of said platform to the floor level, and whereby contraction of said fourth means in combination with downward rotation of the third means forces the plates from the flat horizontal configuration to the step-like configuration.

DESCRIPTION OF THE DRAWINGS

In the drawings:

FIG. 1 is a side view of part of the lift assembly, including the tread and riser plates, in the step-like configuration;

FIG. 2 is a side view of part of the lift assembly in the raised and rigid, flat horizontal configuration;

FIG. 3 is a side view of the lift assembly in the lowered and flat, horizontal configuration;

FIG. 4 is a perspective view showing the lift assembly in place in the recessed opening of a vehicle, the assembly being shown partly lowered in solid lines and fully lowered in broken lines;

FIG. 5 illustrates schematically a preferred embodiment for the means to be used in raising and lowering the lifting columns and attached platform;

FIG. 6 is a side view of the outermost end of the platform in a preferred embodiment illustrating the operation of the safety gate; and FIG. 7 is a side view showing cable system used to actuate the safety gate.

DESCRIPTION OF THE PREFERRED EMBODIMENT

As shown in FIG. 4, the lift assembly 1 is located at the doorway 2 of a vehicle 3 and its platform 4 works within a rectangular recessed opening 5 formed in the sill of the vehicle.

Means are provided from which the platform is suspended; said means may be actuated to controllably raise or lower the platform between grade level 6a and the floor level 6b of the vehicle. More paticularly, with reference to FIG. 5, a pair of vertically disposed tubular outer columns 7a, 7b are fixed to the vehicle at the inner corners of the opening 5. A pair of inner lifting columns 8a, 8b are positioned within the outer columns and are slidable up and down therewithin. Roller chains 9a, 9b are attached to the upper ends of the lifting columns. The roller chains extend up through their respective outer columns, over sprockets 10a, 10b, down to and around a double sprocket 11, and then extend to a fixed bracket 12, secured to the vehicle, to which they are attached. The double sprocket 11 is attached to the piston of a hydraulic lift cylinder 13, which in turn is secured to the vehicle. The movement of the cylinder piston is controlled by a conventional system which does not form part of this system. Thus it is seen that expansion or contraction of the lift cylinder 13 controllably lowers or raises the inner lifting columns simultaneously by moving the double sprocket. Also, the movement of the lifting columns is guided by the outer columns within which they slide.

As shown in FIG. 4, the outer columns are positioned out over the opening 5 so that the lower ends of the lifting columns may move through the opening 5. The outer columns are also provided with slots 14 extending upwardly from their lowermost end to permit the platform to be attached to the inner lifting columns, as described below.

The platform 4 comprises a linear assembly of alternating tread and riser plates 20, 21 interconnected in end-to-end arrangement by hinges 22. The innermost riser plate is connected by a hinge 23 to the lower ends of the lifting columns 8a, 8b. Thus the inner end of the platform is suspended from the lifting columns. The plates are convertible from the step-like configuration shown in FIG. 1 to the flat horizontal configuration shown in FIG. 2. The width of the plates is such that, in the step-like configuration, they horizontally span the distance between the chassis frame 24 and the side 25 of the vehicle body and vertically span the distance between the vehicle floor level 6b and the standard vehicle clearance above the grade 6a.

The outer edge portion 26 of the outermost tread plate carries pairs of spaced upstanding lugs 27 mounted thereon adjacent each of its side edges. Each pair of lugs is aligned with one of the lifting columns.

A radius arm 28 extends downwardly and angularly between each lifting column and the pair of lugs 27 aligned with it. Each such radius arm is pivotally connected by pins 29, 30 with the lugs and lifting column.

A hydraulic cylinder 31 extends along each side edge of the platform. It is pivotally attached by pins 32, 33 to the lower end of the adjacent lifting column and the aligned pair of lugs 27 on the outer tread plate.

It will be noted therefore that the outer end of the platform is held up by the radius arms under tension and the hydraulic cylinders under compression. The platform, radius arms and cylinders are all free to rotate in unison about their pivot connections with the lifting columns and all of them are lowered and raised in unison by said columns.

It has been found desirable to support the assembly of plates between its ends, as a sag can develop when the assembly is fully extended in the flat configuration and is loaded with a passenger. Thus a bracket 34 is provided on each cylinder to form a slot 35; a pin 36, attached to a lug 37 secured to each of the side edges of the inner tread plate, slides within the slot. Thus the position of the central section of the platform is held fixed relative to the cylinder.

During travel or in the usual use of the doorway, the platform is maintained in the step-like configuration. Gusset plates 38 are adjacent the side edges of the inner portion of the outer tread plate to assist in ensuring a rigid assembly when the plates are in the step-like configuration. The pivot point 39 abuts the brackets 34 and the innermost pivot point 40 abuts the vehicle chassis. Hence, all the pivot points between the plates are supported when in said step-like configuration.

With reference to FIGS. 6 and 7, a safety gate 42 is provided at the outer edge of the platform to retain a wheelchair when lifting and lowering operations are underway. The safety gate is pivotally attached to the outer edge of the platform and is movable between an upstanding retaining position (see FIG. 2) and a flat inoperative position (see FIG. 1). A spring 48 is connected between the lug 27 and safety gate; this spring acts to normally urge the gate to the flat position. A cable 43 extends along each side edge of the platform, around a pin 44 and up through the adjacent lifting column; it is attached to the adjacent roller chain by a bolt and connector assembly 50. The eye bolt 51, forming the lower part of the assembly 50, extends through a load-bearing cross member 52 secured to the lifting column. When the roller chain is pulled up, the assembly 50 pulls on the cable 43, thereby rotating the safety gate to the upstanding position and stretching the spring 48. When the eye of the bolt 51 contacts the cross member 52, the safety gate is fully closed. Therafter, the tension exerted by the roller chain is applied through the cross member to the lifting column.

The conversion sequence from the step-like configuration to the flat, horizontal configuration begins with extension of the hydraulic cylinders 31. The radius arms 28 swing through an arc indicated by the broken line 41 so that the outermost tread plate of the platform moves outwards and upward causing the other hinged plates to move out of the step profile. When the cylinders 31 have reached full extension, the plates 20, 21 form a flat, horizontal platform which is even with the floor level 6b of the vehicle, as shown in FIG. 2.

The lowering sequence of the raised horizontal platform to the grade position shown in FIG. 3 is started by extending hydraulic lift cylinder 13, thus providing slack to the two roller chains 9a, 9b. As the chains attain slack, the lift columns 8a, 8b simultaneously move downwards inside the guide columns 7a, 7b. As the platform is lowered, a footguard plate 45 is exposed to prevent the load from rolling under the vehicle.

The platform 4 and the lifting columns 8a, 8b travel downwards through the recessed opening 5 until the platform touches the grade. The cable 43 which holds up the safety gate 42 goes slack at this point and the spring 48 contracts and draws the safety gate down so that it is level with the platform.

The platform is now ready for the boarding of a passenger in a wheelchair. After the wheelchair has moved onto the platform, the safety gate is closed by upward movement of the lifting columns and the platform is raised to the level of the bus. As stated, the lift sequence begins with the closing of the safety gate 42 by tensioning the safety gate cable. The lift cylinder 13 retracts, pulling on the roller chains 9a, 9b which, in turn, cause the lifting columns 8a, 8b to travel upwards through the guide columns 7a, 7b. This action lifts the platform and the passenger. A tension spring 44 pulls the footguard plate 45 upward until it is flush with the bottom step well of the tread and riser configuration. When the platform is level with the floor of the bus, the passenger rolls the wheelchair onto the bus for travelling therein.

The conversion back to the normal position can only be achieved when the platform is in the raised position. The cylinders 31 retract, causing the radius arms 28 to pivot downwards and inward through an arc. The hinged plates buckle at the hinged joints 22 to assume the tread and riser configuration upon full retraction of the cylinders.

While the present invention has been disclosed in connection with a preferred embodiment thereof, it should be understood that there may be other embodiments which fall within the spirit and scope of the invention as defined by the following claims.

The embodiments of the invention in which an exclusive property or privilege is claimed are defined as follows:

1. A lift assembly for use in connection with a recessed opening forming part of the doorway of a vehicle having a floor surface, comprising:
   a pair of substantially vertically movable lifting columns associated with the vehicle and positioned at the opening;
   first means associated with the vehicle for controllably raising and lowering said lifting columns;
   second means fixed to the vehicle for guiding the lifting columns as they move substantially vertically between raised and lowered positions;
   a platform disposed in the opening and comprising a linear assembly of alternating tread and riser plates interconnected by hinge means in end-to-end arrangement, said platform being connected to the bases of the lifting columns at its inner edge portion by hinge means whereby the inner end of the platform is thereby suspended;
   third means, pivotally connected with the outer edge portion of the platform and with the lifting columns, said third means being operative to suspend the outer end of the platform from said lifting columns; and
   fourth means, pivotally connected with the outer edge portion of the platform and with the lifting columns, for extending and contracting the assembly of plates between a flat horizontal configuration level with the floor surface and a step-like configuration within the opening and for retaining said plates in each of said configurations when required;
   whereby extension of said fourth means in combination with rotation of the third means about its pivot connections with the lifting columns forces the plates from the step-like configuration to the flat horizontal configuration, and whereby subsequent lowering of the lifting columns results in lowering of the flat horizontal platform to grade and subsequent raising of the lifting columns results in raising of said platform to the floor level, and whereby contraction of said fourth means in combination with downward rotation of the third means forces the plates from the flat horizontal configuration to the step-like configuration.

2. A lift assembly for use in connection with a recessed rectangular opening forming part of the doorway of a vehicle having a floor surface, comprising:
   a pair of substantially vertically disposed guide members fixed to the vehicle and positioned at the inner corners of the opening;
   a pair of movable lifting columns, one such lifting column being associated with each guide member so as to be slidable therealong;
   means associated with the vehicle for raising and lowering the columns together when actuated so they may be moved up and down within the opening between raised and lowered positions;
   a platform disposed in the opening and comprising a linear assembly of alternating tread and riser plates interconnected by hinge means in end-to-end arrangement, the innermost plate, being a riser plate, being connected to the base portions of the lifting columns at its inner edge portion by hinge means whereby the inner end of the platform is thereby suspended;
   a pair of tension members, each such tension member extending downwardly and angularly between and being pivotally connected with one of the lifting columns and the outermost plate, being a tread plate, for suspending the outer end of the platform from said lifting columns at a level spaced above the connection of the innermost plate with said lifting columns;
   a pair of spaced hydraulic cylinders, each being pivotally connected at its inner end to the base of one of the columns and at its outer end to the outermost plate, for extending and contracting the assembly of plates between a flat horizontal configuration level with the floor surface and a step-like configuration within the opening and for retaining said plates in each of said configurations when required;
   whereby extension of the cylinders in combination with upward rotation of the tension members about their pivot connections with the lifting columns forces the plates from the step-like configuration to the flat horizontal configuration, and whereby subsequent lowering of the lifting columns results in lowering of the flat horizontal platform to grade and subsequent raising of the lifting columns results in raising of said platform to the floor level, and whereby contraction of the cylinders in combination with downward rotation of the tension members forces the plates from the flat horizontal configuration to the step-like configuration.

3. The lift assembly as set forth in claim 2 comprising:
   a slotted bracket and pin assembly interconnecting each hydraulic cylinder with the platform between the latter's ends to assist in maintaining the platform in a substantially flat, horizontal configuration when the cylinders are extended.

4. The lift assembly as set forth in claim 3 which includes gusset plates at the inner end of the outermost plate of the platform, a tread plate, such that the gusset plates abut against the next inner plate, a riser plate, to provide a rigid connection between the two.

5. The lift assembly as set forth in claim 2 wherein:
said means for raising or lowering the lifting columns comprises:
a lift hydraulic cylinder mounted within the vehicle; and
a pair of roller chains, each being secured to the vehicle at one end and to one of the lifting columns at the other end, said roller chains being connected with the lift cylinder between their ends so that movement of the cylinder raises or lowers the lifting columns together.

6. The lift assembly as set forth in claim 5 wherein the vertically disposed guide members fixed to the vehicle and positioned at the inner corners of the opening are tubular with a lifting column running inside.

7. The lift assembly as set forth in claim 2 comprising:
a safety gate pivotally mounted at the outer edge of the platform for movement between a flat position in the plane of the platform and an upraised position substantially perpendicular to the platform;
and means interconnecting the lifting columns and safety gate for pivoting the latter to the upraised position when the lifting columns are initially retracted.

* * * * *